April 16, 1929.                I. W. HENRY                1,709,815
  APPARATUS AND METHOD FOR DISSOCIATING HYDROCARBON FLUIDS AND SOLIDS
    FOR PRODUCTION OF GASES AND LIQUIDS OF LIGHTER MOLECULAR WEIGHT
                       Filed March 20, 1928        2 Sheets-Sheet  2
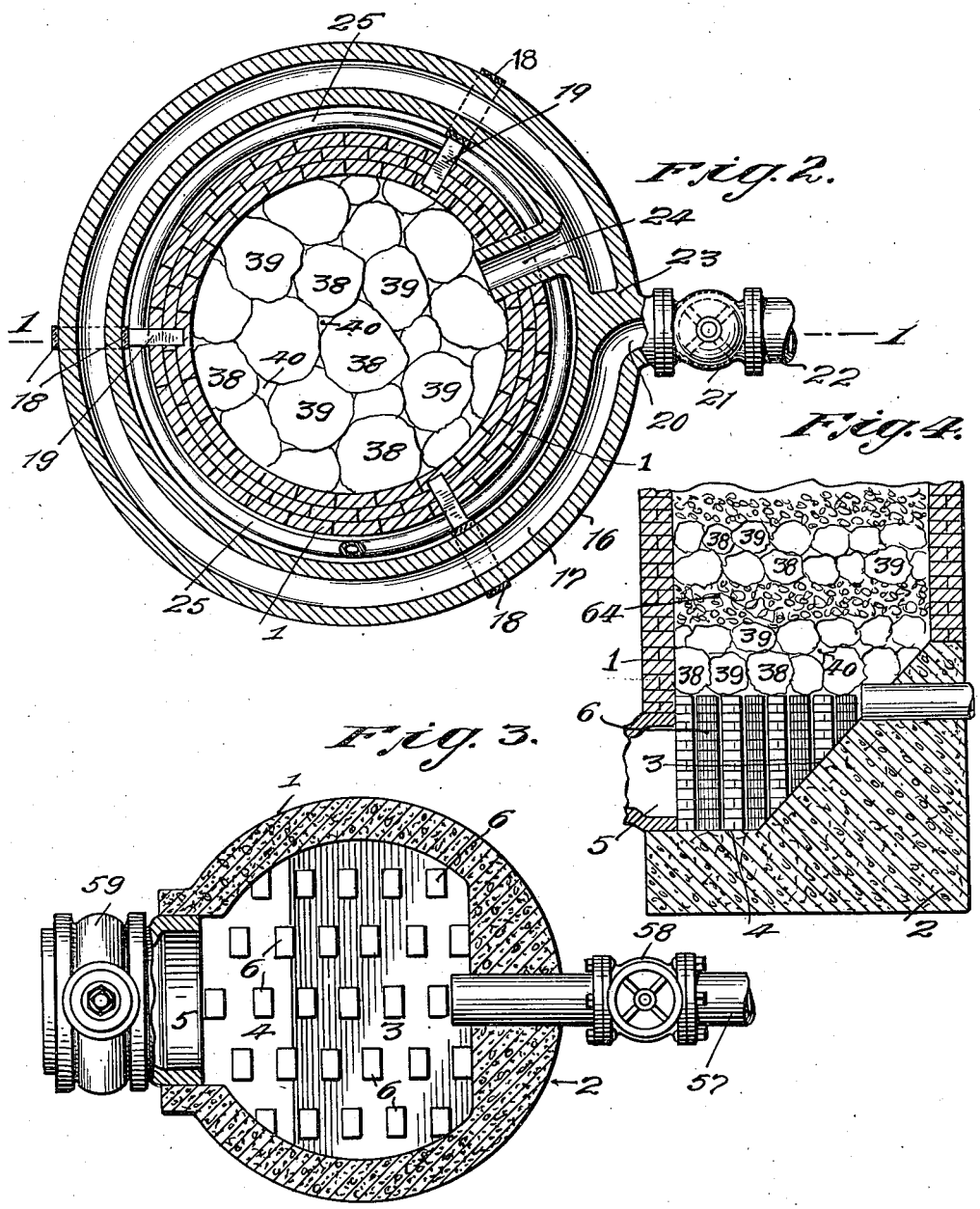

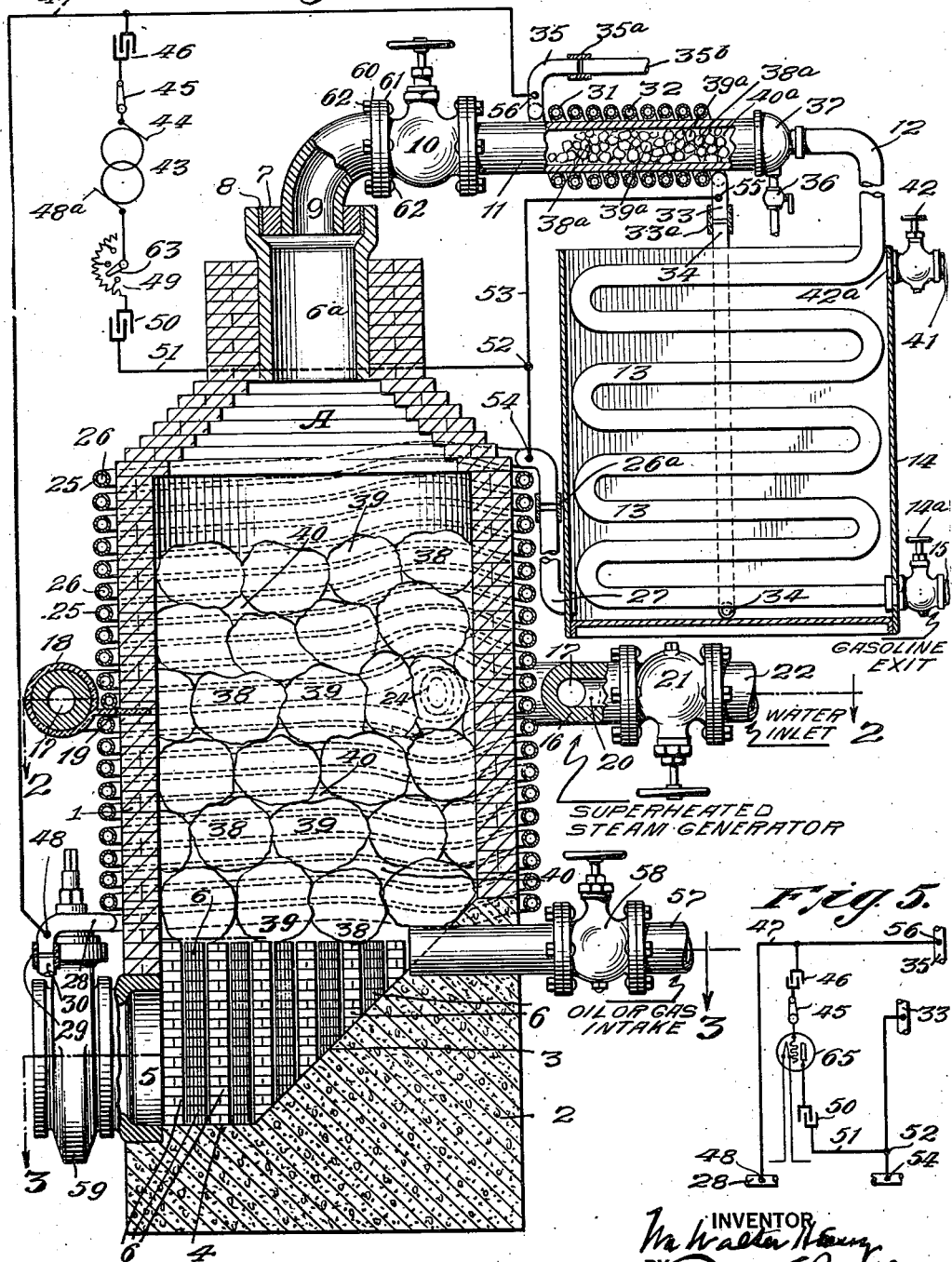

Patented Apr. 16, 1929.

1,709,815

UNITED STATES PATENT OFFICE.

IRA WALTON HENRY, OF GREENWICH, CONNECTICUT, ASSIGNOR TO IONIZING CORPORATION OF AMERICA, OF NEW YORK, N. Y., A CORPORATION OF NEW YORK.

APPARATUS AND METHOD FOR DISSOCIATING HYDROCARBON FLUIDS AND SOLIDS FOR PRODUCTION OF GASES AND LIQUIDS OF LIGHTER MOLECULAR WEIGHT.

Application filed March 20, 1928. Serial No. 263,042.

This invention relates broadly to apparatus for dissociating hydrocarbon fluids and solids for production of gases and liquids of lighter molecular weight. It is particularly applicable to so-called vapor-phase cracking and distillation of petroleum oils for the production of gasoline and for other purposes set forth below.

The object, broadly stated, of this invention is to dissociate hydrocarbon fluids and solids into hydrogen and carbon containing gases, and simultaneously to ionize the carbon molecules in petroleum oil vapor, or in petroleum oil, or in suitable coal gas; to generate hydrogen by dissociation of water in the presence of the ionized carbon molecules and effect chemical combination of the ionized carbon molecules with hydrogen; and to energize the ionization, dissociation of water, and hydrogenation by use of non-depositing, electric current conducting, spaced apart chunks of material, such as graphite or carbon, for examples, which serve as collectors of impurities, such as excess carbon, sulphur and sludge; and for uniformly heating the vapor, gas or oil treated. These chunks are distributed substantially throughout the still from the periphery of its volume cross-sectionally across the volume and lengthwise thereof.

The material to be treated, such as petroleum oil vapor, petroleum oil or coal gas, and said heating and collecting chunks are subjected simultaneously to the action of a high frequency, oscillating, non-sparking, inductively established electromagnetic field within the chamber of a receiver within which said field extends lengthwise and cross-sectionally.

The water to be dissociated into hydrogen and oxygen is preferably but not necessarily introduced into the chamber and field, in the form of superheated steam. Some crude petroleum oils contain emulsified water, and also coal gas, coal and shale contain water in which case it is not necessary to introduce superheated steam from an extraneous source into the receiver and field.

Because of the high frequency, oscillations of said field, and of the electric currents induced in the chunks therein, the carbon containing vapor, oil or oil gas, or other hydrocarbon material to be treated has its carbon content broken up minutely into highly heat-
ed ions which have an affinity for and are combinative with hydrogen. The superheated steam is preferably generated in an iron generator which is heated by induction from said coil. Excess carbon; that is, more than will combine with the hydrogen, and other impurities, deposit on said heated chunks, thus cleaning the vapor of impurities; but nearly all the carbon in the vapor, gas or oil, or other hydrocarbon treated, is conserved and utilized in combination with hydrogen in the liquid product.

In the accompanying drawings, forming a part hereof and illustrating apparatus embodying the present invention, Fig. 1 is a vertical, sectional elevation at line 1—1 of Fig. 2, of a still and its supplementary vapor receiver; the chamber of the still and the chamber of the receiver being each provided with partially spaced apart, electric current conducting chunks of refractory material, with interspaces between them for flow of gaseous vapor. The view also shows a superheated steam generator and cooling apparatus together with a high frequency, oscillating, non-sparking, electric current generating and conducting apparatus diagrammatically illustrated and in electric connection with an electric current and water conducting coil around the still, and with another electric current and water conducting coil around the supplementary, vapor receiver.

Fig. 2 is a cross sectional plan view at line 2—2 of Fig. 1 and particularly illustrates the superheated steam generator.

Fig. 3 is a plan view at line 3—3 of Fig. 1 through the foundation of the still.

In the foregoing views the apparatus is in condition for treatment of either an oil or of a gas.

Fig. 4 is a cross sectional view of the still charged with alternating layers of said electric current conducting chunks and of solid material to be treated which may be either coal or shale.

Fig. 5 is a modification showing an audion or vacuum radio tube substituted for the electric current generator and rheostat shown in Fig. 1.

Referring to the illustrated form of the apparatus, the still A is shown vertical and supported on a concrete foundation 2. A portion 3 of the bottom wall of the foundation is slantingly constructed and its portion 4 is flat. A pit is formed by the foundation and provided with a clean cut opening 5. A series of vertical, spaced apart piers 6 of refractory brick are supported by the floor of the pit. Their tops are at the same level and form supports for the hereinafter mentioned chunks. Above its foundation the wall of the still is constructed of checker work of non-magnetic, ceramic bricks. The still might be of pyrex glass or other suitable material. The top of the retort is contracted and provided with a vertical clay conduit 6ª having a clay cover 7 gas tightly positioned in the top of the conduit by a cement ring 8. A clay conduit 9 extends upwardly from cover 7 and connects with a regulating and shut-off valve 10, the discharge side of which is connected with the supplementary, vapor receiver 11. The discharge end of the latter connects with a cooling pipe 12 which has bends 13 located in tank 14 for cooling water or other cooling medium. The bends of the cooling pipe are located in the tank which is spaced apart from the apparatus described and is to be located in any proper position. The lower bend 13 of the coil passes through the tank, and is exteriorly provided with a shut-off valve 14ª from which, through a conduit 15, the cooled liquid product of the apparatus is discharged.

An annular, superheated steam generator 16, preferably of iron, encloses the still and the coil around it, and is spaced apart from the coil, and interiorly provided with a chamber 17. The annular, superheated steam generator is supported in place by supports the outer ends of which are each provided with an annular, generator enclosing ring 18 of electric insulating material provided with inward extensions 19 that are anchored in the checker work. The intake portion 20 of the superheated steam generator communicates with a regulating valve 21, the intake side of which is connected with a conduit 22 for supply of water to the chamber 17. A solid portion or partition 23 divides the intake portion of chamber 17 from its terminal end, near which the chamber 17 is provided with a super-heated steam discharge nozzle 24 passing between turns of the coil, and through the checker work, being anchored therein and discharging into the chamber of the still A.

Still A is enclosed, from near the upper end of its foundation upwardly to its contracted top portion, by an electric current, and cooling water, conducting copper coil 25, the bore of which is indicated by 26. The upper turn of the coil is connected by an electric insulating coupling 26ª with a water pipe 27 from the bottom of the cooling tank 14. The under end portion 28 of the coil is connected by an electric insulating coupling 29 with a cooling water discharge conduit 30.

The vapor receiver 11 is partially surrounded by a copper, electric current and water conducting coil 31, the bore of the coil being indicated by 32. One end of this coil 31 extends as a conduit 33 and connects through an insulating coupling 33ª with a conduit 34 entrant in the bottom portion of tank 14 for reception of cooling water. The other end portion 35 of the coil 31 for discharge of cooling water is to be carried to any desired place and connected by an electric insulation coupling 35ª with the ultimate discharge pipe 35ᵇ. The purpose of connecting the cooling water discharge pipes insulatedly with the coils is for safety to attendants.

It will be observed that no exterior heating means are provided for the still, the vapor receiver or the superheated steam generator. None are necessary. No exterior electric sparking or flame is used and safety of life and property is thereby enhanced.

Vapor receiver 11 is provided with a test cock 36, accessibly mounted in its end 37 for use for ascertaining the character and molecular weight or density of each given distillate produced by treatment in the apparatus.

The chamber of still A is cross sectionally and vertically provided with a series of irregular, stationary chunks 38 of refractory, electric current conducting material. These chunks are piled loosely in place and are partly in contact and partly out of contact. They are shown partially in direct contact to insure electric current conduction from one to another. The under layer of chunks is supported on the tops of the pit piers 6, and the other chunks are piled on the under layer and each other. Some of the chunks, such as those indicated by 39 may be of nickel or other catalytic, solid metal. Chunks 38 and 39 are piled haphazardly with interspaces 40 between them for reception and flow of oil or oil vapor, or of gas, between the chunks.

The corresponding chunks 38ª and 39ª in the vapor receiver are similarly located with interspaces 40ª between them. The chunks 39 of catalytic metal may be omitted when and if catalysis is not desired.

The chunks 38 and 38ª are of graphite, carbon or the like. I have obtained the best results by use of graphite chunks.

The water tank is connected with a water supply conduit 41 having a shut-off valve 42 for intake of cooling water or other medium through port 42ª into the tank chamber.

Referring now to the diagrammatically illustrated electric apparatus, 43 is a suitable source of high frequency, oscillating, electric current, indicated as an alternating generator. Its brush 44 is in electric connection with a switch or fuse 45 electrically connected with a condenser 46. The condenser 46 is electrically connected with a conductor 47, one end of which is electrically connected at 48 to the discharge end portion 28 of coil 25. The alternating current generator 43 is also electrically connected through its brush 48ª with a rheostat 49, the purpose of which is to control the heat in the still A and in the receiver 11. The rheostat is electrically connected with a condenser 50 which is electrically connected to a conductor 51 which at 52 is electrically connected to a conductor 53. One end of conductor 53 is electrically connected at 54 to the upper end portion of coil 25. The other end of conductor 53 is electrically connected at 55 to the water discharge end portion 33 of the coil 31 around the vapor receiver; and the other end of conductor 47 is electrically connected at 56 to the water discharge end portion of the coil 31.

Said electric apparatus serves for establishment of a high frequency, oscillating, non-sparking, electromagnetic field in still A and also in the vapor receiver 11.

Oil or gas is introduced into the still and its pit through an intake conduit 57 provided with a regulating and shutoff valve 58. The clean out opening 5 is provided with an oil and gas tight closure 59 indicated as a gate valve. The conduit 9 has a flange 60 which matches the corresponding flange 61 of valve 10. The two flanges are detachably secured together by bolts 62. Thus conduit 9 and cover 7 are readily removed whenever desired; as for examples, when still A is to be charged as hereinafter described, with coal or with shale in association with the chunks 38 and 39, either or both; or, when it is desired either to rake out or to clean out the still by burning accumulated sludge and impurities. In the latter case the open conduit 6ª will serve as a chimney and gate valve 59 be opened to secure a draft, the requisite heat being obtained by turning on the current and raising the chunks 38 and 39 to a high heat. Whenever the current is on, these chunks, the walls of the still and the pit piers are all raised to a high heat.

Said stationary, refractory, electric current conducting chucks 38 and 39, as also the corresponding chunks 38ª and 39ª in the vapor receiver, serve as short-circuited secondaries when the current from the high frequency, alternating current generator is on. The chunks are then highly heated and may be raised to a red hot temperature if desired.

Sulphur, other impurities and sludge accumulate on the chunks and pit piers which thus serve for removing impurities from the oil or gas treated. The chunks are non-depositing to prevent such deposit of detached portions of them as would fill and clog the interspaces 40 for the oil or gas or vapors under treatment.

Vapor receiver 11 with its coil in electrical connection with the high frequency, alternating current generator may often be used without connection with the still A. The vapor receiver may be, by itself, put into conduit connection with stills of various types in oil cracking and distillation plants, or, if desired, with coal gas holders, and effectively used.

In the present apparatus, shown in Fig. 1, for the cracking and distillation of petroleum oils particularly, the vapor receiver 11 serves for re-purifying and for liquefying the gaseous vapors produced by treatment of petroleum oil in the still A; and its functions are similar in the treatment of material other than petroleum oil. The liquefaction of the vapors or gases is effected by the action of the electromagnetic field and short-circuited secondaries in the vapor receiver 11, prior to its discharge therefrom into the cooling pipe 12.

Whenever the current is on, a high frequency, alternating, non-sparking, electromagnetic field is set up within still A and also within the vapor receiver 11; and so also, in case the still A or vapor receiver 11 are used alone. The function of this electromagnetic field is to violently tear apart and dissociate hydrocarbon fluids or solids, within the influence of the field, into hydrogen and carbon containing gases; such dissociated gases being dissociated in the presence of oxygen and hydrogen evolved by dissociation of aqueous moisture in the material treated; or, of superheated steam, raised from water from an extraneous source and dissociated in the still chamber; the dissociation of the aqueous moisture or superheated steam providing the still chamber and said electromagnetic field with hydrogen and oxygen, both directly within the still chamber. Hydrogen thus provided, whether from moisture in the material or from the superheated steam from the extraneous water, unites with the dissociated carbon, hydrogenating the oil vapors evolved by the treatment. The aqueous content, if any, of the material of course passes into superheated steam prior to its dissociation. The chemical activities involved are probably intensified by the action of the catalytic agents if they are used. Precisely the same behavior and effects attend use of the vapor receiver by itself; but when still A and the vapor receiver 11 are in conduit connection as shown, the hydrogenated oil vapors in still A rise through conduits 6ª and 9 and pass into the vapor receiver wherein they are re-purified and wherein they are also liquefied into an extremely hot liquor which is cooled by passage through the cooling pipe. The dissociated carbon molecules in the still and also in the vapor receiver become electrically charged by induction, move with enormous velocity and may be of an electronic character.

When crude petroleum oil or other hydrocarbon oil is admitted into the still it floods the pit and the chunks 38 and 39 may be wholly or partially submerged. The vaporization involved by the dissociation of the oil into a hydrocarbon vapor and impurities is enormously active and effective, and the gaseous vapors are very largely purified directly within the chamber of still A. The re-purification and liquefaction occurring in the vapor receiver effectively relieve the liquid passing out of the vapor receiver from offensive stench and impurities so that I can produce sweet smelling, pure gasoline and draw it continuously from the discharge conduit 15 during an operation of the apparatus.

According to the energy of the high frequency, electric current and of the electromagnetic field and adjustment of the rheostat, the material treated; said chunks; and the water introduced into the super-heated steam generator can be subjected either to a low temperature such as the steam making temperature of water (212° Fah.); or to an intermediate temperature; or to a very high temperature. I have found that temperatures varying from 700° Fah. to 1200° Fah. greatly intensify the effective action of the electromagnetic field.

It is to be noted that because the chunks 38 and 39 extend wholly across the chamber of still A and similarly wholly across the chamber of the vapor receiver, and along the lengths of such chambers, and become highly heated, they serve uniformly to heat the material to be treated, across its entire cross section. This uniform heat is of great importance and overcomes a serious practical difficulty existing in prior oil cracking and distillation stills wherein the peripheral portions of the oil have been more highly heated than the central portions or vice versa depending on the mode of applying the heat and such uneven heating has been recognized as a substantial defect. The distribution of the chunks 38 through the vapor, oil or gas not only causes the same to be uniformly heated but effects uniform vaporization and increased attenuation of the vapor. One function of said chunks is to serve as auxiliary heaters of the vapor treated.

The supply of water to the superheated steam generator may be cut off or regulated by the valve 21, and thus the volume of the superheated steam from water from an extraneous source may be regulated or cut off.

A very important feature of the invention is that by adjustments of the movable member 63 of the rheostat 49, the heat in the high frequency, oscillating, non-sparking, electromagnetic field may be varied according to the quantity or mass and character of the material treated, and according to the requirements of each specific product desired. In practice, I use cycles from about 480 to about 2,000 per second, and take samples from the test cock 36 to determine the exact conditions of the vapor or liquid within the vapor receiver. Accordingly, instead of liquefying in the vapor receiver, one may merely re-purify a hydrocarbon vapor passing therethrough, if so desired.

In the preliminary operation of warming up the apparatus by merely turning on the current, the temperature of the electromagnetic field, of the chunks and of the metal walls of the superheated steam generator are preferably raised to a temperature at which water in said generator or any water contained in the material to be treated is dissociated into hydrogen and oxygen; and I ordinarily increase the energy of the electromagnetic field in point of temperature from 490° Fah. up to and in many cases, as high as 1200° Fah. for intensification of the breaking up of the carbon molecules or particles as thoroughly and minutely as possible.

I have successfully used the present apparatus and method for production of gasoline, as above stated, and I have also successfully used it, by making a further cut in the distillation process, for making benzol ($C_6H_6$). I have also used the apparatus and method successfully for extracting oil from shale; for gasifying coal; and for converting ordinary coal gas, by passing it through the structure which I have herein called a vapor receiver, into benzol ($C_6H_6$).

Whenever desired, sludge withdrawn from the pit and having an oil content may be run into the still with other material as an enricher; and in the case of extremely light gases or vapors, such as those of a benzolic character it is desirable to introduce the sludge. The gas and gaseous vapors evolved from the sludge, being relatively heavy, load the lighter gaseous vapors or gases and thus tend to retain them from too rapid ascent.

Oxygen produced in the still by dissociation of water or superheated steam appears to oxidize some of the impurities, such as sulphur, for example, and to be otherwise burned up.

So far as the apparatus shown is concerned it is only one of many forms that may be devised for use in working my new method; and, only one of many forms that may be devised for use in effecting the principles of the present invention in a mechanical arrangement.

Adjustment of the rheostat varies the temperature in the electromagnetic field, chunks and still walls; and I have found, in practising the invention for gasoline production, that it is practical to obtain gasoline continuously without any residuum except the sludge and impurities; and I have also produced the gasoline continuously with a substantial residuum of oil in the sludge for the purpose of using such oily residuum as a base for lubricating oil.

I have above referred to use of cycles of from 480 to 2000 per second, but such reference was in connection with the alternating current generator shown. Some high frequency current generators are obtainable that will enable the use of any cycles desired. If desired, the high frequency, oscillating, non-sparking, electromagnetic field may be produced by use of the well-known mercury arc, spark-gap apparatus. In this latter apparatus, a change of frequency is produced by varying the length of the mercury arc; and is productive of cycles of from 40 to 20,000 per second. I also note that in practice with alternating current generators, lower frequency and short wave lengths produce effects similar to those above described. If desired, an exciter inserted in connection with a rheostat will produce the desired change in cycles as a matter of regulation, as will be understood by all skilled in the electrical art without more particular description.

The electromagnetic field is not, of and by itself, a hot field but becomes a hot field when the starting material is in the field, the starting material acting as resistance to the waves or oscillations of the field, short-circuited currents being induced in any resistant material.

I use the term, starting material, conveniently to cover the material to be treated.

The flexibility of the apparatus and method is one of the marked advantages of the invention, as it is thereby made easily practicable to produce a satisfactory range of desired hydrocarbon products of different molecular weights or density.

In Fig. 1, the turns of the coil 25 around the still are shown laterally bent apart adjacent the steam nozzle 24 in order to make room for entrance of the nozzle into the steam chamber.

In Fig. 4, the chunks 38 and 39, either or both, with interspaces 40 between them are arranged in beds alternating with beds 64 of starting material which may be either shale or coke.

The dissociated carbon particles produced by the treatment may be called carbon ions; and the method may be considered as involving ionization; but I do not wish to make the invention dependent on mere terms respecting the constitution of matter that are more or less indefinite in the present state of science.

In the modification indicated in Fig. 5 a well-known audion or vacuum radio tube 65, is shown in the circuit illustrated in Fig. 1, in place of the rheostat 49 and the alternating current generator 43. I have found in practice that the audion; or as it is otherwise called, a radio vacuum, oscillating, sending tube, may be used for producing high frequency oscillations in the electromagnetic field above described in connection with the apparatus of Fig. 1.

For cracking and liquefying crude petroleum oils, the described invention has among other advantages over the prior art, that of displacing the present practice of desulphurizing by flowing gasoline over iron filings to take up sulphur, and of atomizing the desulphurized oil in water to wash out sulphuric acid, and bleaching the desulphurized and deacidized oil.

The desired liquefaction under and by the influence of the oscillatory waves in the electromagnetic field, in their co-action with the shortcircuited forming chunks of stationary, refractory material that does not pulverize and deposit, is another striking advantage of this invention. The carbon in the oil is, by the dissociation, brought into a condition of excessively minute particles, the hydrogen in the oil being freed. The carbon particles becomes conductors of the electric energy. In this condition of the carbon particles, they have intense affinity for all hydrogen in their presence, whether the hydrogen produced by dissociation of superheated steam raised from introduced extraneous water; or produced by the conversion of moisture in the starting material into superheated steam that becomes dissociated. The variation of the cycles effected, under such conditions of operation and treatment, effects that wide range of production of different liquids of required molecular weight or density.

In practice the coils around the still and vapor receiver are cool. The superheated steam generator is covered by asbestos or other suitable heat insulating material, not shown. The high frequency, oscillating rays or waves of an electromagnetic field extend not only across the circular space enclosed by the coil but also extend exteriorly of the coil. Hence the iron of the superheated steam generator is a resistance in the exterior electromagnetic field of the coil around the still and cooperates with the exterior rays or waves to heat the superheated steam generator. This is a marked economy, and the safety factor of the invention is one of highest importance.

The liquefaction obtained under heat, prior to cooling, is one of the striking features of the invention as is also the collection of sulphur and other impurities as sludge on the short-circuited secondaries and provision for cleaning them by burning off the impurities while they are in the still.

When ever desired, either the still or the vapor receiver, or both, may be connected communicatingly with an existing source of hydrocarbon vapor or gas for further treatment. Such an arrangement is sometimes advantageous as it permits use of existing apparatus and serves for purifying and liquefying gasous vapor or gas admitted from the existing apparatus to which it is attached.

As an example of one use of the apparatus, I may mention that I have obtained from crude petroleum oil, a very important percentage yield of pure white gasoline, that is without offensive odor, obtaining same with no other pressure in the chambers of the apparatus than that due to the expansion of the gaseous vapors therein. The apparatus was operated for such production at an internal temperature of about 220° cent., the cycles, although they are to be varied for different grades of crude oil and other starting material, being about 10,000 per second. By variation of the cycles the chunks or short-circuited secondaries are automatically heated.

The carbon itself, in the starting material, serves as an electric resistance and by generating the hydrogen exclusively within the chambers of the apparatus greater economy and very much greater safety are obtained than would be the case if the hydrogen were from the extraneous hydrogen supply. But in the present case, the internally produced hydrogen is attended by the simultaneous production of oxygen and the oxygen serves to oxidize the sulphur and other impurities and to insure their deposition on the short-circuited secondaries.

In operation, the hydrogenated hydrocarbon gaseous vapors are stratified in the still, which may be also called a converter, the vapors of the lighter molecular weight becoming superposed on vapors of heavier molecular weight. These stratified vapors continually pass into the vapor receiver and therein they become mixed. By varying the cycles or frequency of oscillations per second in the electromagnetic field in vapor receiver 11, or by adjustment of the rheostat or current control means, the internal heat in the chamber of the vapor receiver is also varied, and the resultant temperature in co-action with the short-circuited secondaries produces liquefaction of the vapor mixture. Such liquefied products may be gasoline, rhigolene, benzene, kerosene, benzol, lubricating oil, or fuel oil. The frequencies of oscillations selected and the temperature effected by adjustment of heat regulating means shown as a rheostat are always such as are found to be specifically appropriate, on trials at the test cock for each specific product desired.

One of the important advantages of this invention is that it makes practicable the erection of large stills of ceramic checker-work at a comparatively low cost. In present oil cracking plants, the stills are commonly of steel and provided with exterior heating apparatus. In stills such as set forth herein, exterior heating apparatus is dispensed with and requisite hot temperatures obtained by the resistance of the short circuited secondaries forming material.

What I claim is:

1. In apparatus of the class described, a still mounted on a chambered foundation provided with upstanding, chunk supporting piers, said chunks being located within an electromagnetic field and constituting short-circuited secondaries of the electric circuit through the coil; the chamber of said foundation being provided with a valved opening and the chamber of the still being provided at its upper portion with a removable closure for an opening; whereby, when the current is on and no starting material is in the still, the heat obtainable from the co-action of said field and chunks serves for burning sludge collected on the chunks and walls of the still and of the foundation chamber.

2. In apparatus of the class described, the combination with a chambered still of dielectric capacity for reception of hydrocarbons to be treated; a high frequency, alternating electric current conducting coil; and, within the chamber of the still, a short-circuited secondary forming element for effecting a high frequency, non-sparking, oscillating electromagnetic field within the coil and still chamber; of a superheated steam generator having a nozzle for discharging superheated steam into said field within said chamber; and, in communication with said still, a chambered hydrocarbon vapor receiver of dielectric capacity; a high frequency, alternating electric current conducting coil for said receiver; and, within the chamber of the receiver, a short-circuited secondary forming element arranged to effect a high frequency, non-sparking, oscillating electro-magnetic field within the last mentioned coil and the chamber of said receiver, and effective to liquefy within the receiver the hydrocarbon vapor received from the still; the receiver being provided with an outlet for the liquefied hydrocarbon vapor.

3. In apparatus of the class described, the combination with a chambered still of dielectric capacity for reception of hydrocarbons to be treated; a high frequency, alternating electric current conducting coil; and, within the chamber of the still, a short-circuited secondary forming element for effecting a high frequency, non-sparking, oscillating electromagnetic field within the coil and still chamber; of a superheated steam generator having a nozzle for discharging superheated steam into said field within said chamber; and, in communication with said still, a chambered hydrocarbon vapor receiver of dielectric capacity; a high frequency, alternating electric current conducting coil for said receiver; and, within the chamber of the receiver, a short-circuited secondary forming element arranged to effect a high frequency, non-sparking, oscillating electro-magnetic field within the last mentioned coil and the chamber of said receiver, and effective to liquefy within the receiver the hydrocarbon vapor received from the still; the receiver being provided with an outlet for the liquefied hydrocarbon vapor; said superheated steam generator being heated by induction from a high frequency, oscillating electric current conducting coil.

4. In apparatus of the class described, the combination with a chambered still of dielectric capacity for reception of hydrocarbons to be treated; a high frequency, alternating electric current conducting coil; and, within the chamber of the still, a short-circuited secondary forming element for effecting a high frequency, non-sparking, oscillating electromagnetic field within the coil and still chamber; of a superheated steam generator having a nozzle for discharging superheated steam into said field within said chamber; and, in communication with said still, a chambered hydrocarbon vapor receiver of dielectric capacity; a high frequency, alternating electric current conducting coil for said receiver; and, within the chamber of the receiver, a short-circuited secondary forming element arranged to effect a high frequency, non-sparking, oscillating electro-magnetic field within the last mentioned coil and the chamber of said receiver, and effective to liquefy within the receiver the hydrocarbon vapor received from the still; the receiver being provided with an outlet for the liquefied hydrocarbon vapor; said secondary forming element within the still chamber being effective to heat the hydrocarbons therein treated uniformly throughout their extent.

5. In apparatus of the class described, the combination with apparatus for vaporizing hydrocarbon starting material, such apparatus comprising in combination a still; means for establishing within the chamber of the still a high frequency, alternating, non-sparking electromagnetic field; a superheated steam generator discharging into the still chamber; electric current conducting, short-circuited secondaries forming material within said chamber and electromagnetic field; said electromagnetic field being effective to dissociate superheated steam admitted to said chamber into hydrogen and oxygen and simultaneously to vaporize the hydrocarbon starting material; said still having a vapor outlet; and a vapor receiver in conduit connection with the still chamber, said vapor receiver having means for establishing within its chamber a high frequency, alternating, non-sparking electromagnetic field and also short-circuited secondaries forming material; the vapor receiver being provided with a vapor outlet and having a fluid discharge; said short-circuited secondaries in the still chamber being effective as sludge collectors for purification of the therein hydrogenated hydrocarbon vapors; and the vapor receiving apparatus being effective to convert said purified vapor into a deodorized and otherwise purified hydrocarbon liquid.

6. In the combination claimed in claim 5, catalytic metal associated with the short-circuited secondaries forming material, for intensification of chemical combinations occurring within the still chamber.

7. In the combination claimed in claim 5, chunks of catalytic metal associated with said short-circuited secondaries forming material in the vapor receiver.

8. In the combination claimed in claim 5, said superheated steam generator being a chambered annulus electrically insulated from the still; enclosing the still and being within the influence of said electromagnetic field, when the current is on; having a water intake and a nozzle projecting into the still and being provided with a partition between the water intake and said nozzle.

9. In apparatus of the class described, the combination with a still, and means for establishing a high frequency, oscillating, non-sparking electromagnetic field within the still chamber; a superheated steam generator discharging into said chamber and electromagnetic field; and a short-circuited secondary forming element within said chamber and electromagnetic field; said electromagnetic field being effective to dissociate the superheated steam into hydrogen and oxygen for supplying said chamber therewith, and also to vaporize hydrocarbonaceous starting material to be treated simultaneously with the dissociation of superheated steam; the still having a sludge collecting pit opening into the still chamber and the pit being provided with a clean out opening provided with a closure.

10. In apparatus of the class described, for vaporizing hydrocarbon starting material, the combination with means for establishing a high frequency, oscillating, non-sparking electromagnetic field within the still chamber; stationary, refractory, non-depositing, electric current conducting chunks in the still chamber and said electromagnetic field; a superheated steam generator discharging into the still chamber and said electromagnetic field; the chunks, when the current is on. serving as short-circuited secondaries and sludge collectors; and a vapor receiver communicating with the still chamber, having an outlet port and being exteriorly provided with an electric current conducting coil and interiorly provided with electric current conducting stationary chunks forming short-circuited secondaries within the vapor receiver, and serving to establish, within the chamber of the vapor receiver, a high frequency, oscillating, non-sparking electromagnetic field; and cooling apparatus in communication with said outlet port of the receiver; the apparatus being effective to vaporize hydrogenated and purified hydrocarbon vapor formed in the still chamber; and to convert such vapor passing into the vapor receiver into a hot hydrocarbon liquid.

11. The herein described method of dissociating hydrocarbon fluids and solids, as starting material, for production of gases and liquids of lighter molecular weight, consisting in subjecting hydrocarbon starting material, in partial confinement, to the action of a high frequency, oscillating, non-sparking, electromagnetic field provided with short-circuited secondary circuit forming stationary, partially spaced apart, chunks of refractory material in electric current conducting relations one to another, and in thereby dissociating the starting material into free hydrogen and carbon vapors, within the place of partial confinement; and in simultaneously providing the still chamber and said electromagnetic field with hydrogen and oxygen both from dissociation of superheated steam; and in passing the hydrogenated hydrocarbon vapors thereby produced into another electromagnetic field charged with other short-circuited secondary circuit forming, stationary chunks of electric current conducting material; and therein liquefying the vapors under the heat of said field and coacting chunks.

12. The herein described method of dissociating hydrocarbon fluids and solids, such as petroleum oil, coal oil, shale oil, or coal or shale, as starting material, for production of gases and liquids of lighter molecular weight, consisting in dissociating the starting material into free hydrogen and free carbon in a high frequency, oscillating, non-sparking electromagnetic field provided with stationary, sludge collecting, short-circuited, secondary forming members located in said field and inductively energized by said field; and in simultaneously dissociating superheated steam into free hydrogen and free oxygen in the presence of the other dissociated hydrogen and the free carbon; thereby forming a hydrogenated carbon containing vapor; and in passing and continuously subjecting said vapor to the action of another high frequency, oscillating, non-sparking electromagnetic field provided with short-circuited, secondaries forming members located in said other field and inductively energized by such field, and in thereby converting the re-treated vapor into a liquid.

13. The herein described method of cleaning stills that are provided with means for establishing, within the still chamber, a high frequency, oscillating, non-sparking electromagnetic field provided with short-circuited secondaries forming sludge collecting chunks; said method consisting in subjecting, when the still is free of starting material, said chunks and the impurities collected thereon to heat produced by co-action of said electromagnetic field and short-circuited secondaries circuit forming, sludge collecting chunks; thereby burning off impurities deposited on the chunks; and in removing products of such combustion and leaving the chunks intact.

14. The herein described method of dissociating hydrocarbon fluids and solids, as starting material, for production of gases and liquids of lighter molecular weight, consisting in subjecting hydrocarbonaceous hydrogenated vapors to the action of a high frequency, oscillating, non-sparking electromagnetic field provided with electrically energized and thereby heated resistances; thereby liquefying the vapors by the co-action of the electromagnetic field oscillations and of the heat, and in simultaneously effecting deposition of oxidized sludge constituents on the resistances.

15. The herein described method of dissociating hydrocarbon fluids and solids, as starting material, for production of gases and liquids of lighter molecular weight, consisting in simultaneously dissociating electrically resistant starting material into free hydrogen and free carbon; dissociating superheated steam into hydrogen and oxygen; and subjecting the dissociated constituents to the co-action of a high frequency, oscillating, non-sparking electromagnetic field, in a place of partial confinement, wherein the pressure is solely due to expansion of the vapors, gases or liquids produced; and in varying the cycles of said electromagnetic field and thereby stratifying the gaseous vapors in the place of partial confinement.

16. The herein described method of dissociating hydrocarbon fluids and solids, as starting material, for production of gases and liquids of lighter molecular weight, consisting in simultaneously ionizing, vaporizing and hydrogenating the starting material and at the same time effecting deposit of sludge on sludge collectors in the presence of the hydrogenated vapor, in a non-liquid state; in removing the so purified hydrogenated non-liquid vapor from the still chamber and away from the sludge collectors; and in then subjecting said vapor to the action of electric current conducting secondaries in a high frequency, oscillating, non-sparking electromagnetic field, in a place of partial confinement, and converting said hot, non-liquid vapor into a hot liquid; and in passing and cooling such hot liquid.

17. The herein described method of dissociating hydrocarbon fluids and solids, as starting material, for production of gases and liquids of lighter molecular weight, consisting in dissociating the starting material, in a place of partial confinement within which heat is generated, into free hydrogen and free carbon, and non-liquid vapor; in simultaneously purifying such vapor; in passing the purified hot, non-liquid vapor into another place of partial confinement and therein subjecting it to the action of a high frequency oscillating, non-sparking electromagnetic field, and converting it into a hot hydrocarbon liquid; and in removing and cooling such liquid.

18. The herein described apparatus including a still of ceramic checker work having an escape port for lighter products of treatment and, in its under portion, a port for escape of heavier products of treatment; within the still chamber, short-circuited secondaries forming material; and enclosing the still, an exterior, high frequency, alternating current conducting coil.

19. In the apparatus claimed in claim 18, a superheated steam generator enclosing the ceramic checker work, discharging into the still chamber, and located in working proximity to said coil.

20. A method of converting petroleum oil or other bituminous starting material into a cool, bituminous liquid, consisting in subjecting the starting material to the action of a high frequency, electromagnetic field; in simultaneously providing the starting material with hydrogen, and also simultaneously removing impurities from the hydrogenated vapor; in passing the hydrogenated vapor into a high frequency, alternating electromagnetic heating field, therein and thereby liquefying the vapor; and in passing said liquid out of said field and cooling it.

21. The method of simultaneously providing the chamber of a walled member with hydrogen, oxygen and an oily, gaseous vapor, consisting in simultaneously providing the chamber of a walled member with hydrogen and oxygen from dissociating of an aqueous volume heated to dissociating temperature by the action of a high frequency electromagnetic field; and simultaneously bringing an oily, gaseous vapor, the hydrogen and the oxygen into contact in a high frequency electromagnetic field; and therein subjecting them to the thermal action of heat induced from said field; in passing such hot gaseous oily vapor into another high frequency electromagnetic field and therein subjecting it to the action of said field; and in removing sulphur and other impurities from the gaseous vapor in the course of its flow.

Signed at New York in the county of New York and State of New York, this 19th day of March A. D. 1928.

IRA WALTON HENRY.